(12) United States Patent
Stephen

(10) Patent No.: US 9,704,415 B1
(45) Date of Patent: Jul. 11, 2017

(54) DYNAMIC AUTO-ADVANCE FEATURE FOR REFRESHABLE BRAILLE DISPLAYS

(71) Applicant: Freedom Scientific, Inc., St. Petersburg, FL (US)

(72) Inventor: Joseph K. Stephen, Eden Hills (AU)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 15/389,486

(22) Filed: Dec. 23, 2016

Related U.S. Application Data

(60) Provisional application No. 62/382,509, filed on Sep. 1, 2016.

(51) Int. Cl.
*G09B 21/00* (2006.01)
*G09B 21/02* (2006.01)

(52) U.S. Cl.
CPC .................. *G09B 21/003* (2013.01)

(58) Field of Classification Search
CPC ...... G09B 21/03; G09B 21/004; G09B 21/02; G09B 21/001; H01H 13/85
USPC ......................................................... 434/114
See application file for complete search history.

(56) References Cited

U.S. PATENT DOCUMENTS

| | | | | |
|---|---|---|---|---|
| 3,395,247 A | * | 7/1968 | Fieldgate ............. | G09B 21/003 178/17 R |
| 2003/0122689 A1 | * | 7/2003 | Romeo ................ | G09B 21/005 341/21 |
| 2005/0117952 A1 | * | 6/2005 | Damery ............... | B41J 3/32 400/109 |
| 2011/0111375 A1 | * | 5/2011 | Luu ..................... | G09B 21/004 434/114 |
| 2012/0214139 A1 | * | 8/2012 | Murphy .............. | G09B 21/003 434/114 |

OTHER PUBLICATIONS http://www.applevis.com/forum/braille-ios-and-mac-os-x/auto-advance-and-mac-or-ios, accessed Jan. 19, 2017, pp. 1-2.
http://www.applevis.com/forum/braille-users/question-about-using-braille-display-ios-device, accessed Jan. 19, 2017, pp. 1-2.
https://www.afb.org/afbpress/pub.asp?DocID=aw060406 &Mode=Print, accessed Jan. 19, 2017, pp. 1-7.

* cited by examiner

*Primary Examiner* — Andrew Iwamaye
*Assistant Examiner* — Jerry-Daryl Fletcher
(74) *Attorney, Agent, or Firm* — Andriy Lytvyn; Anton J. Hopen; Smith & Hopen, P.A.

(57) ABSTRACT

A method of dynamically establishing an auto-advance interval of a refreshable braille display. The method involves the step of establishing a default auto-advance value, during which a full line of braille characters remains displayed on the braille display prior to being replaced by the next line. The method further involves determining whether a current line of braille characters ends with a blank cell or a used cell and calculating the current auto-advance interval based on the number of used cells in the current line. The next line of braille characters is output after the current auto-advance interval has lapsed.

16 Claims, 3 Drawing Sheets

DYNAMIC AUTO-ADVANCE FEATURE FOR REFRESHABLE BRAILLE DISPLAYS

CROSS REFERENCE TO RELATED APPLICATION

This application claims priority to currently U.S. Provisional Patent Application Ser. No. 62/382,509 filed Sep. 1, 2016 entitled "Dynamic Auto Advance," the contents of which are herein incorporated by reference.

BACKGROUND OF THE INVENTION

Field of the Invention

This invention relates to refreshable braille displays. More specifically, it relates to dynamically establishing an auto-advance interval for each line of braille characters based on the number of used braille cells in that line.

Background of the Invention

Refreshable braille readers enable blind and visually-impaired users to read electronic documents using the braille language. The refreshable braille displays contain a number of braille cells, each of which can be used to output a braille character corresponding to an alphanumerical character. A screen reader software, such as JAWS®, is used to output alphanumeric characters within an electronic document onto the braille display. After a line of text is output onto the braille display, the user reads the output using his or her fingertips. When the user is done reading the current line of the braille display, the user presses a key to refresh the braille display with a next line of braille characters.

In the past, braille display users had to manually press a button after reading each line of braille characters to output the next line. Although this task may seem insignificant, it constitutes a major inconvenience to the braille display users often interrupting the flow of the content and reducing the reading speed. To remedy this issue, JAWS® screen reader currently has a braille reading mode called auto-advance. Auto-advance automatically refreshes the braille display at preset intervals, thereby enabling continuous reading.

One problem with the current auto-advance feature is that the braille display is refreshed in fixed time intervals without accounting for the blank cells. Electronic documents often contain lines with only a few words, much shorter than larger braille displays. When these short lines are output onto the braille display, a plurality of braille cells may remain blank. The blank cells may also be a result of the need to wrap words which might be broken across a braille display boundary. When this occurs, the line is shorter than the full width of the braille display. Since the fixed auto-advance interval is set by the user for optimal reading when the braille display is full, the user may be left waiting for the remainder of the auto-advance interval after completing reading a shorter line. This waiting period undermines the efficacy of the auto-advance feature.

Some braille displays address the problem described above by providing sensors that track the movement of the user's finger across the braille display, and automatically refresh the braille display when the user finishes reading the last braille cell. This solution requires additional hardware to be deployed within the braille display, thereby making this solution incompatible with standard braille displays that are not equipped with such sensors. Inclusion of additional sensors into the braille display also increases the cost, power consumption, complexity, and makes the braille display more prone to malfunctioning.

Accordingly, what is needed is a software-based solution that would dynamically determine the appropriate auto-advance interval on a line-by-line basis.

SUMMARY OF THE INVENTION

The long-standing but heretofore unfulfilled need for a software-based solution for dynamically determining the appropriate auto-advance interval for a braille display on a line-by-line basis is now met by a new, useful, and nonobvious invention.

The invention pertains to a method of dynamically advancing a refreshable braille display. The braille display is in communication with a non-transitory tangible computer-readable medium having computer-executable instructions for outputting an electronic document. A default auto-update interval for the braille display is preset. The default auto-update interval may be adjusted by the user based on user's reading ability and preferences. The default auto-update interval is the duration during which a full line of braille characters remains displayed prior to being replaced by the next line of braille characters.

A portion of the electronic document is output onto the braille display as a current line of braille characters. Some lines of braille characters are full, meaning that all cells of the braille display are displaying either braille characters or spaces between them. For the full line of text, the default auto-advance interval is used. In some instances, the braille display outputs a short line of braille characters. A short line is the one that ends with one or more blank braille cells. Users will generally require less time to read a short line than a long line.

The invention performs a check to determine whether the current line ends with a blank braille cell, which would correspond to a short line. Responsive to determining that the current line ends with the blank braille cell, the last used braille cell in the current line is identified. Every cell to the left of the cell displaying a braille character is considered a used cell. A ratio of a number of used cells to a total number of cells within the braille display is calculated. The default auto-advance interval is then multiplied by this ratio to obtain a current auto-advance interval for the current line. The next line of braille characters is output after the current auto-advance interval has lapsed.

In an embodiment, a minimum auto-advance interval may be preset. If the current auto-advance interval is greater than zero but less than the minimum auto-advance interval, then the next line of braille characters will be displayed after the minimum auto-advance interval has lapsed. The user can adjust the minimum auto-advance interval per his or her preferences. If the current auto-advance interval is equal to zero, due to the Braille display being completely blank, the current line of braille characters is skipped and the next line of braille characters is displayed.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
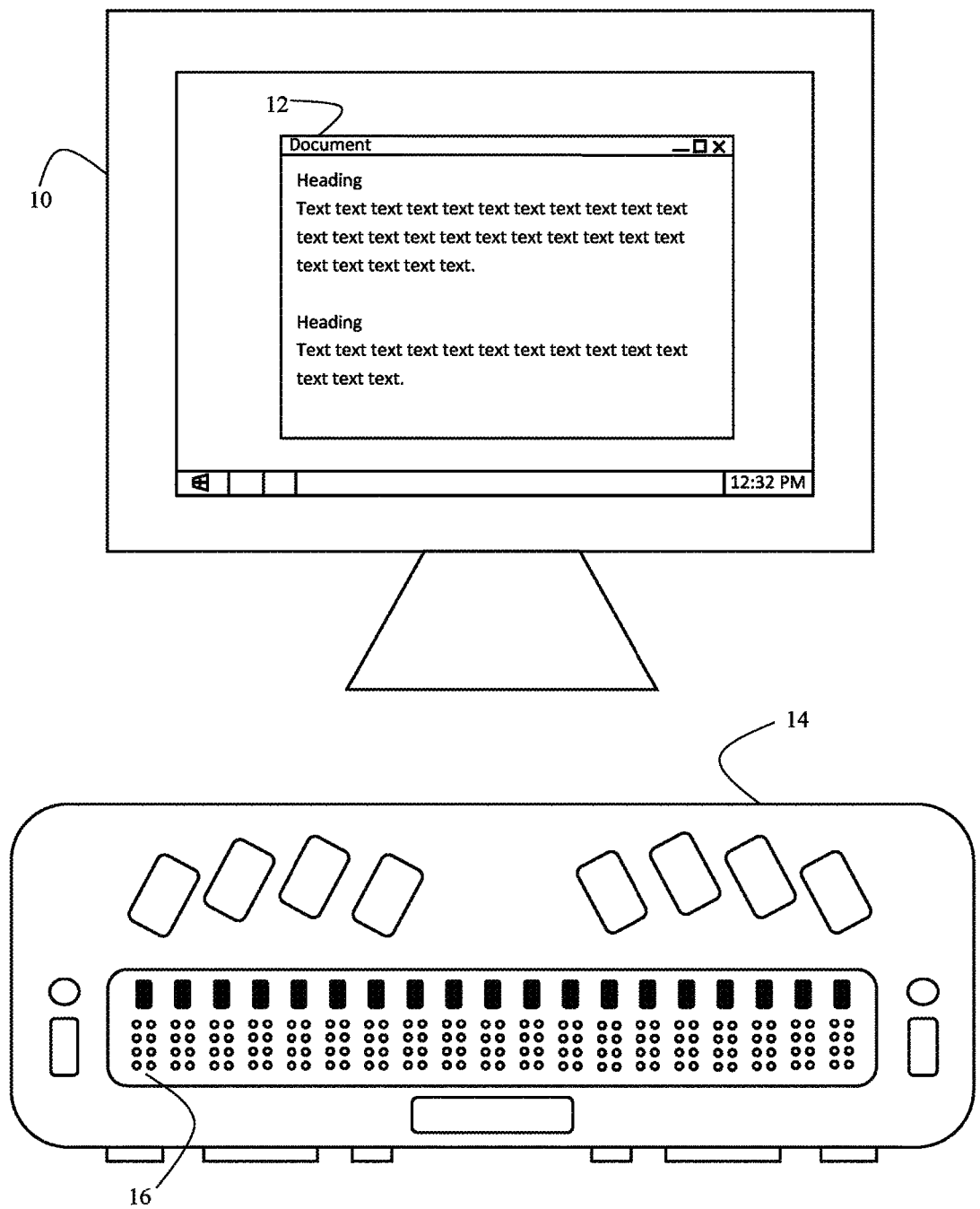
FIG. 1 is a conceptual view depicting a refreshable braille display in communication with a computing device displaying an electronic document.

The invention pertains to method of automatically detecting the length of the line output by the braille display and dynamically adjusting the refresh interval based on the length of each line. FIG. 1 depicts a computing device 10 having a non-transitory tangible medium displaying an electronic document 12. Electronic document 12 has a number of lines of alphanumerical characters. Braille display 14 communicates with computing device 10. Braille display 14 contains a plurality of braille cells 16, each comprising a set of eight pins. Each braille cell 16 can be used to output a braille character corresponding to an alphanumerical character within electronic document 12.

Electronic document 12 contains several lines of text having only a few words. These lines contain less alphanumerical characters than the total number of braille cells 16 in with braille display 14. When these short lines of text are output onto braille display 16, one or more of braille cells 16 will remain blank. Blank cells may also appear due to the need to wrap words which might be broken across a braille display boundary.

Figure 2A:
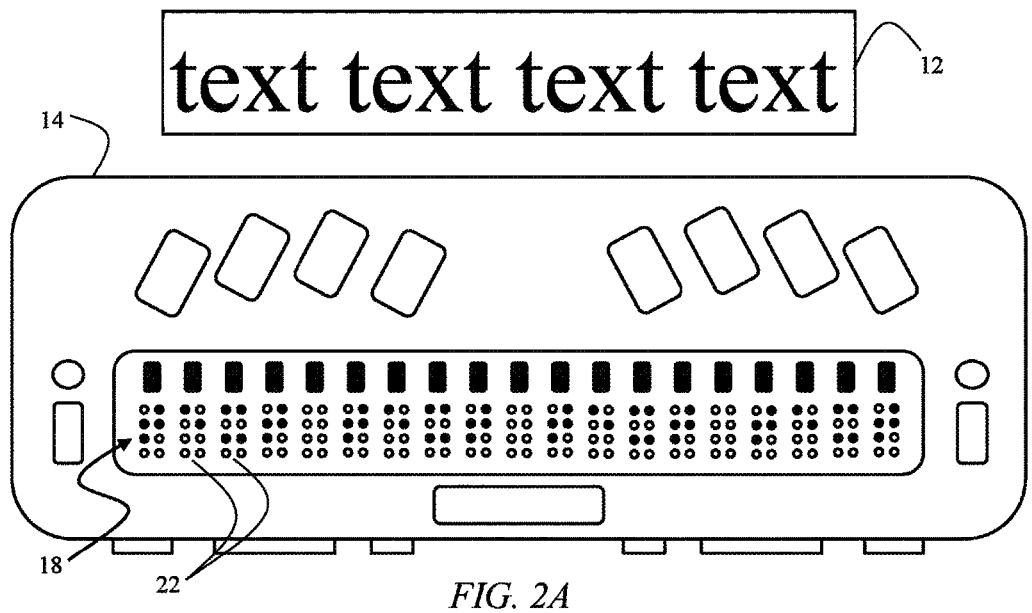
FIG. 2A is a conceptual view depicting the braille display outputting a full line of text.
Figure 2B:
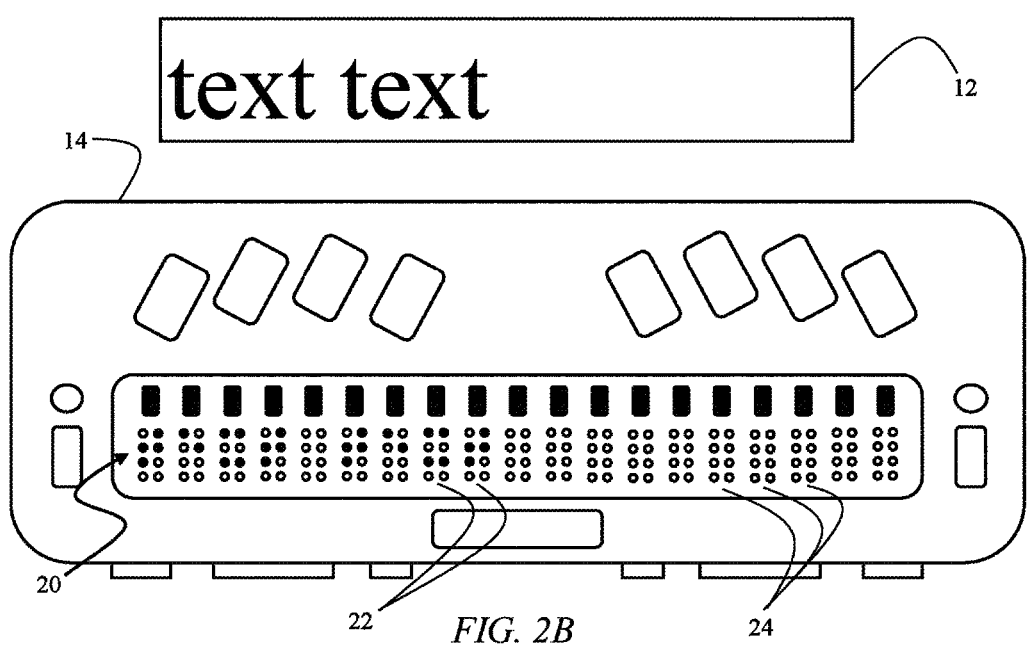
FIG. 2B is a conceptual view depicting the braille display outputting a short line of text.

FIG. 2A depicts braille display 14 outputting a full line of braille characters 18, while FIG. 2B depicts braille display 14 outputting a short line 20. FIG. 2B depicts that within short line 20, to the right of the used cells 22, there is a plurality of blank cells 24. Because blank cells 24 do not contain any braille characters, the user will generally need less time to read short lines 20 than full lines 18. Blank cells 24 that are located to the left of a used cell 22 are also considered used cells 22 because the user must scan these cells in order to read the current line up to the non-empty cells output by braille display 14.

Figure 3:
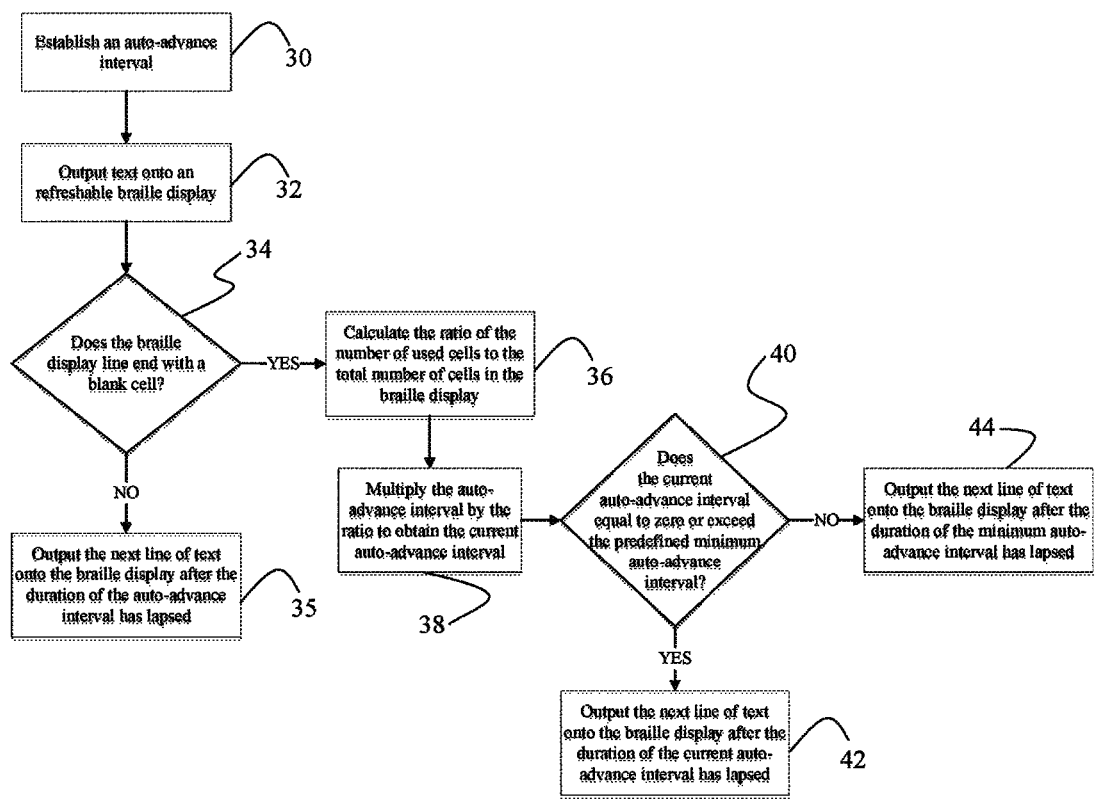
FIG. 3 is a flowchart depicting the steps of the method of updating the braille display with a next line of braille characters according to the present invention.

FIG. 3 depicts a flow chart illustrating the dynamic auto-advance feature according to an embodiment of the invention. In step 30, a default auto-advance interval is established. This interval corresponds to the amount of time the user generally requires to read a full line of braille characters 18. In step 32, text is output onto braille display 14. In step 34, the method determines whether the line ends with a blank cell 24, which would correspond to a short line 20, or a used cell 22, which would correspond to a full line 18. If, in step 34, it is determined that the current line of braille display 14 ends with a used cell 22, then the default auto-advance interval is used to output the next line of text in step 35.

If, however, in step 34, it is determined that the braille display 14 ends with a blank cell 24, the method proceeds to step 36. In step 36, a ratio of the number of used cells 22 to the number of total cells is calculated. In step 38, the default auto-advance interval is multiplied by this ratio to obtain a current auto-advance interval. In step 40, the current auto-advance interval is compared against a predefined minimum auto-advance interval. The predefined minimum auto-advance interval is the minimum duration required for comprehension by the majority of braille readers. In one embodiment, the minimum auto-advance interval may be set to 1000 milliseconds. The user can change the minimum auto-advance interval to correspond to his or her braille reading ability and preferences. If, in step 40, it is determined that the current auto-advance interval exceeds the predefined minimum auto-advance interval, then the current auto-advance interval is used to output the next line of text in step 42. Otherwise, the system uses the minimum auto-advance interval to output the next line of text in step 44.

The method described above also accounts for those instances when the braille display 14 outputs a completely blank line. In that case, the line will end with a blank cell 24 and will have zero used cells 22. Consequently, the ratio calculated in step 36 will be equal to zero. Thus, the current auto-advance interval will also be equal to zero because it is a product of this ratio and the default auto-advance interval. The auto-advance interval of zero will cause the braille display to skip the blank line and output the next line of text. Accordingly, the method illustrated in FIG. 3 accounts for blank lines and automatically skips them.

Hardware and Software Infrastructure Examples

The present invention may be embodied on various computing platforms that perform actions responsive to software-based instructions and most particularly for low-vision user software. These include both traditional desktop and notebooks devices and also smartphones and tablets. Furthermore, the computing device may reside within the braille display, thus making the braille display a standalone reader for electronic documents. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to certain statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic, Objective C, Python or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

GLOSSARY OF CLAIM TERMS

Blank cell—a braille cell that is not displaying a braille character and that does not have any cells displaying a braille character to its right.

Braille display—an electro-mechanical device for displaying braille characters, usually by means of pins raised through holes. The pins are grouped into braille cells, wherein each cell can display a single alphanumerical character.

Current auto-advance interval—a time interval calculated for each short line of braille characters during which the corresponding line remains displayed on the braille display prior to being replaced by the next line of braille characters. The duration of the current auto-advanced interval is based on a number of used cells in the current line of braille characters.

Default auto-advance interval—a predefined time interval during which a full line of braille characters remains displayed on the braille display prior to being replaced by the next line of braille characters. This is the default time period for updating the braille display under the auto-advance function.

Line of braille characters—a plurality of braille cells displaying a plurality of braille characters corresponding to alphanumerical characters within an electronic document.

Minimum auto-advance interval—a minimum predefined time period during which a short line of braille characters remains displayed on the braille display prior to being replaced by the next line of braille characters.

Used cell—a braille cell displaying a braille character or any cell to the left of a cell displaying a braille character. The user scans the used cells to read the output of the braille display.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of dynamically advancing a refreshable braille display, the method comprising the steps of:
   providing a braille display in communication with a non-transitory tangible computer-readable medium having computer-executable instructions for outputting an electronic document;
   setting a default auto-update interval for the braille display;
   outputting a portion of the electronic document onto the braille display as a current line of braille characters;
   determining whether the current line ends with a blank braille cell;
   responsive to determining that the current line ends with the blank braille cell, calculating a current auto-advance interval for the current line as a function of a number of used cells within the current line and the default auto-update interval; and
   automatically outputting a next line of braille characters after the current auto-advance interval has lapsed.

2. The method of claim 1, further comprising the steps of:
   establishing a minimum auto-advance interval;
   comparing the current auto-advance interval against the minimum auto-advance interval; and
   responsive to the current auto-advance interval being greater than zero but less than the minimum auto-advance interval, outputting the next line of braille characters after the minimum auto-advance interval has lapsed.

3. The method of claim 1, wherein responsive to the current auto-advance interval being equal to zero, skipping the current line and outputting the next line of braille characters.

4. The method of claim 1, further comprising the step of responsive to a determination that the current line ends with a used cell, outputting the next line after the default auto-advance interval has lapsed.

5. The method of claim 1, wherein the default auto-advance interval is user-adjustable.

6. One or more non-transitory tangible computer-readable media having computer-executable instructions for outputting alphanumerical characters onto a refreshable braille display, the instructions comprising:
   accessing an electronic document;
   setting a default auto-update interval for the braille display;

outputting a portion of the electronic document onto the braille display as a current line of braille characters;

determining whether the current line ends with a blank braille cell;

responsive to determining that the current line ends with the blank braille cell, calculating a current auto-advance interval for the current line as a function of a number of used cells within the current line and the default auto-update interval; and automatically outputting a next line of braille characters after the current auto-advance interval has lapsed.

7. The media of claim 6, wherein calculating the current auto-advance interval comprises the steps of:

identifying a last used braille cell in the current line;

calculating a ratio of a number of cells preceding and including the last used cell to a total number of cells within the braille display; and multiplying the ratio by the default auto-advance interval to obtain the current auto-advance interval for the current line.

8. The media of claim 7, further comprising the steps of:

establishing a minimum auto-advance interval;

comparing the current auto-advance interval against the minimum auto-advance interval; and responsive to the current auto-advance interval being greater than zero but less than the minimum auto-advance interval, outputting the next line of braille characters after the minimum auto-advance interval has lapsed.

9. The media of claim 6, wherein responsive to the current auto-advance interval being equal to zero, skipping the current line and outputting the next line of braille characters.

10. The media of claim 6, further comprising the step of responsive to a determination that the current line ends with a used cell, outputting the next line after the default auto-advance interval has lapsed.

11. The media of claim 6, wherein the default auto-advance interval is user-adjustable.

12. A method of dynamically advancing a refreshable braille display, the method comprising the steps of:

providing a braille display in communication with a non-transitory tangible computer-readable medium having computer-executable instructions for outputting an electronic document;

setting a default auto-update interval for the braille display;

outputting a portion of the electronic document onto the braille display as a current line of braille characters;

determining whether the current line ends with a blank braille cell;

responsive to determining that the current line ends with the blank braille cell, identifying a last used braille cell in the current line;

calculating a ratio of a number of cells preceding and including the last used cell to a total number of cells within the braille display;

multiplying the default auto-advance interval by the ratio to obtain a current auto-advance interval for the current line; and automatically outputting a next line of braille characters after the current auto-advance interval has lapsed.

13. The method of claim 12, further comprising the steps of:

establishing a minimum auto-advance interval;

comparing the current auto-advance interval against the minimum auto-advance interval; and responsive to the current auto-advance interval being greater than zero but less than the minimum auto-advance interval, outputting the next line of braille characters after the minimum auto-advance interval has lapsed.

14. The method of claim 12, wherein responsive to the current auto-advance interval being equal to zero, skipping the current line and outputting the next line of braille characters.

15. The method of claim 12, further comprising the step of responsive to a determination that the current line ends with a used cell, outputting the next line after the default auto-advance interval has lapsed.

16. The method of claim 12, wherein the default auto-advance interval is user-adjustable.

* * * * *